United States Patent [19]

Van Erden

[11] Patent Number: 5,322,579
[45] Date of Patent: Jun. 21, 1994

[54] METHOD OF FORMING SIDE SEAMS FOR ZIPPERED BAGS OR PACKAGES

[75] Inventor: Donald Van Erden, Wildwood, Ill.

[73] Assignee: Illinois Tool Works Inc., Glenview, Ill.

[21] Appl. No.: 39,644

[22] Filed: Mar. 30, 1993

[51] Int. Cl.⁵ .......................... B31B 1/90; B65B 9/08
[52] U.S. Cl. ........................ 156/66; 53/451; 53/551; 156/251; 493/213; 493/214; 493/215
[58] Field of Search ............. 156/66, 251, 308.4, 156/309.6, 497, 499; 493/213-215, 194, 203, 927; 53/451, 551, 452

[56] References Cited

U.S. PATENT DOCUMENTS

| | | | |
|---|---|---|---|
| 4,070,222 | 1/1978 | Olson | 156/251 |
| 4,259,134 | 3/1981 | Joice | 156/251 |
| 4,308,087 | 12/1981 | Johnson | 156/510 |
| 4,498,839 | 2/1985 | Johnson | 156/66 |
| 4,687,532 | 8/1987 | Johnson | 156/251 |
| 4,709,533 | 12/1987 | Ausnit | 53/451 |
| 4,812,192 | 3/1989 | Woods | 156/66 |
| 4,867,735 | 9/1989 | Wogelius | 493/203 |
| 4,892,512 | 1/1990 | Branson | 156/66 |
| 4,961,805 | 10/1990 | Siebert | 156/251 |
| 4,976,811 | 12/1990 | Siebert | 156/66 |

FOREIGN PATENT DOCUMENTS 2251404  7/1982  United Kingdom ............... 493/214

Primary Examiner—Michael W. Ball
Assistant Examiner—Daniel J. Stemmer
Attorney, Agent, or Firm—Kane, Dalsimer, Sullivan, Kurucz, Levy, Eisele and Richard

[57] ABSTRACT

A method for manufacturing reclosable plastic bags or packages, wherein sections of zipper profiles are pre-softened at intervals equal in length to the width of the bags or packages to be manufactured. The pre-softening enables the zipper profiles to be fused together and completely flattened when a seal bar clamps thereacross to form a side seal area transverse to the zipper.

13 Claims, 1 Drawing Sheet

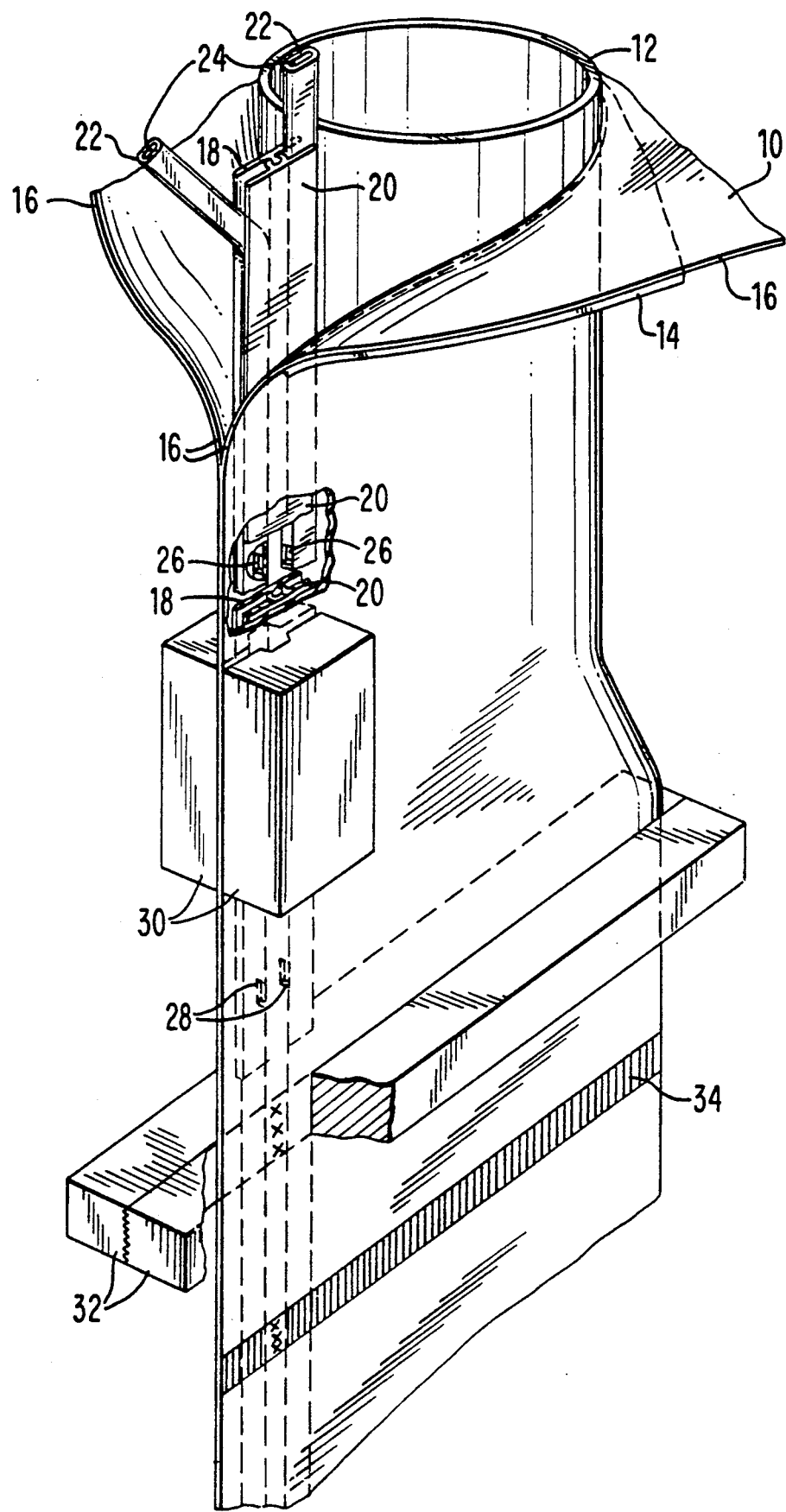

METHOD OF FORMING SIDE SEAMS FOR ZIPPERED BAGS OR PACKAGES

BACKGROUND OF THE INVENTION

1. Field of the Invention

The present invention relates to the manufacture of plastic bags or packages having two plies of thermoplastic sheeting, both plies having closure strips formed or included on their facing inner edges so as to form a sliderless zipper closure for the openings of the bags or packages made therefrom. The plies may be formed of two separate sheets or a single sheet folded over.

2. Description of the Prior Art

The present invention relates to improvements in the package-making art and may be practiced, without limitation, in the manufacture of thermoplastic bags and trays of the kind that may be used for various consumer products, but which are particularly useful for food products which must be kept in moisture and air-tight packages, free from leakage until opened for access to the product contents, which packages are then reclosable by zipper means to protect any remainder of the product therein.

The indicated art is fairly well developed, but nevertheless is still susceptible of improvements contributing to increased efficiency and cost effectiveness.

One problem that still exists in the production of packages from continuous zipper-equipped sheet material, is the difficulty in attaining a satisfactory sealing of the bag or package against leakage, where the zipper and area of film engaged by the zipper extends through the side seal areas separating one bag or package from the next.

SUMMARY OF THE INVENTION

The present invention is directed at a method for manufacturing plastic bags or packages representing a solution to the above-mentioned problem in the prior art. In its broadest form, the method comprises the step of softening the interlocked male and female profile sections on both the profile surface and the opposite surface as the bag or package is being manufactured at preselected intervals corresponding to the width of the bags or packages being manufactured. The interior softening is accomplished by directing intermittent blasts of hot air through holes provided in insulated tubes used to guide the interlocked profile sections during the manufacture of the packages. This pre-heating of the profiles is at points where side seals are to be provided, and allows the profiles to be sealed together and flattened more readily by the seal bars during the bag making operation.

The present invention will now be described in more complete detail below with reference frequently being made to the following figure.

BRIEF DESCRIPTION OF THE DRAWING

The FIGURE shows an apparatus with which the present invention may be practiced.

DETAILED DESCRIPTION OF THE PREFERRED EMBODIMENT

Referring to the FIGURE, which depicts an apparatus used in manufacturing plastic bags or packages, the apparatus having been modified to do so in accordance with the present invention, plastic sheet material 10 is directed toward a filling tube 12 and associated forming collar 14, which guides the plastic sheet material 10 around the filling tube 12 to form a tube of the plastic sheet material. The fill tube 12 may, for example, be the fill tube of a conventional vertical form fill and seal (VFFS) machine. As this is done, the lateral edges 16 of the plastic sheet material 10 are brought together so that they may ultimately form the two sides of the opening of a plastic bag or package being manufactured on the machine.

As the two lateral edges 16 are brought together, a male profile section 18 and a female profile section 20, previously interlocked with one another and provided on the interior surface of the sheet material (i.e. the surface directed toward the fill tube), are continuously guided therebetween on two guide tubes 22. The guide tubes 22, which may have thin rectangular cross sections, each include an internal conduit 24 through which blasts of hot air may be forcibly directed. guide tubes 22 are disposed between the interlocked male profile section 18 and female profile section 20, and on either side of their interlocked parts. At preselected intervals, holes 26,28 through the guide tubes 22 permit hot air to escape in timed blasts upon the interlocked male and female profile sections 18,20. Except for the holes 26,28 the guide tube 22 are insulated. The hot air issuing from the holes 26,28 serves to pre-soften only those portions of the male profile section 18 and female profile section 20 adjacent thereto, those portions ultimately being the locations of side seal areas separating individual bags or packages. Further, the hot air is directed at the actual engaging surfaces of the profiles, rather than at the rear of the profiles as would be the case if air were directed from without rather than from within the package. This permits the profiles to be softened to facilitate their being fused together in a tight seal.

In the actual manufacture of plastic bags or packages using the apparatus shown in the FIGURE, the plastic sheet material 10 is moved incrementally in amounts equal in length to the width of the bags or packages being manufactured. Each time the plastic sheet material 10 is at rest, several actions take place simultaneously.

Firstly, blasts of hot air issue from holes 26 in guides 22 to pre-soften adjacent areas of the male profile section 18 and female profile section 20.

Secondly, vertical seal bars 30 compress the two lateral edges 16 of the plastic sheet material 10 together and seal them to the male and female profile sections and, if desired, each other outboard of the profile sections. That is, if desired, the vertical seal bars 30, in addition to fusing the zipper to the plastic material may be used to form a seal outboard of the zipper by fusing the edges 16 to each other which must first be cut or otherwise ruptured by the consumer to provide access to the zipper for opening the final bag. Alternatively, a separate vertical seal bar (not shown) may be provided for joining the edges of the plastic sheet.

Thirdly, as hot air issues from holes 26 hot air also issues from holes 28 to again presoften adjacent areas of the male and female profile sections 18,20. Holes 26 and holes 28 being separated by an amount equivalent to two bag or package widths.

And fourthly, horizontal seal bars 32 clamp completely across the plastic sheet material 10 to form a side seal area 34 and which is also cut to form separate plastic bags or packages. It should be appreciated that whereas the zipper in the preferred embodiment is provided separate from the plastic sheet material, the profile sections could have been formed integrally with the plastic sheet material or formed separate from the plastic sheet material but attached to the plastic sheet material before the bag making machine or at the bag making machine upstream of the heating air holes 26. What is important is that the profiles be interlocked when pre-softened and attached to the plastic sheet material when the side seals are formed.

The distance between the locations where each of these four actions takes place is equal to the bag or package width. Referring now to a given location where a side seal area 34 is ultimately to be made, the interlocked profiles 18,20 are first pre-softened by hot air issuing from holes 26. Plastic sheet material then is moved one bag or package width, leaving the pre-softened area between vertical seal bars 30. Vertical seal bars 30 close and seal the male and female profile sections 18,20 to the plastic sheet material 10.

The vertical seal bars 30 open and the plastic sheet material 10 advances another bag or package width. It will be appreciated that on a VFFS machine product is introduced into each bag or package through the fill tube prior to forming the final side seal for that bag. The areas of the male and female profile sections 18,20 previously pre-softened at holes 26 are again pre-softened at holes 28. Finally, after plastic sheet material 10 advances still another bag or package width, horizontal seal bars 32 clamp across the plastic sheet material 10 and interlocked male and female profile sections 18,20 at the pre-softened point to mash the profiles flat so that they fuse together and form a side seal area 34.

Guide tubes 22 having holes 26,28 separated by different amounts may be substituted into the apparatus, or having holes 26,28 whose positions may be adjusted, and, having appropriately modified the locations of the vertical seal bars 30 and horizontal seal bars 32, plastic bags or packages of different widths may be manufactured.

Modifications to the above would be obvious to those skilled in the art, but would not bring the method so modified beyond the scope of the appended claims. For example, the zipper may be disposed on the plastic sheet at some point other than at the lateral edges so that material is provided between the male and female profile thereby providing a tamper evident barrier outboard of the profiles in the final bag which must be ruptured before the profiles can be separated. Further, in some instances it may be desirable to provide guides upstream and downstream of hole 26 and/or hole 28 to separate and then reclose the zipper profiles before and after the presoftening hot air blast or to provide open zipper profiles and only close the profiles after presoftening.

Having thus described the invention, what is claimed is:

1. A method for manufacturing plastic bags or packages wherein a longitudinally extending continuous plastic zipper having male and female profiles on interior surfaces of the plastic bag or package provides a resealable closure between two plies of plastic sheet material, said plastic sheet plies being welded together with a transverse seal at preselected intervals separated by a distance corresponding to the width of the bags or packages being produced to thereby provide side seals separating said bags or packages, said method comprising the steps of:

providing a continuous plastic zipper with male and female profiles between two plies of said plastic sheet material which form the interior surfaces of said bag or packages;

directing heat from between said two plies to a relatively short length of said continuous plastic zipper profiles whereby to presoften sections of said male and female profiles within said relatively short length of plastic zipper; and, making a transverse crosswise seam across said two plies of plastic sheet material and through said presoftened male and female profile sections.

2. The method in accordance with claim 1 wherein said male and female profiles are interlocked prior to directing heat thereon.

3. The method in accordance with claim 1 wherein heat is directed to said relatively short length of said continuous plastic zipper at a plurality of locations.

4. The method in accordance with claim 1 wherein said directing heat step is accomplished by directing a hot air blast at the surfaces of said male and female profile sections within said relatively short length of said continuous plastic zipper to be softened.

5. The method in accordance with claim 4 comprising the further step of providing said two plies of plastic sheet material by folding a single sheet of plastic material into a generally tubular shape.

6. The method in accordance with claim 4 wherein said hot air blast is directed against said surfaces of said male and female profile sections simultaneously from more than one direction.

7. Th method in accordance with claim 1 wherein said plastic sheet material and said continuous plastic zipper are separately provided and further comprising prior to the step of heating a relatively short length of said continuous plastic zipper, the steps of:

attaching said male profile of said continuous plastic zipper to one of said plies of plastic sheet material;

attaching said female profile of said continuous plastic zipper to the other of said plies of plastic sheet material.

8. The method in accordance with claim 7 further comprising, prior to said attaching steps, the step of directing heat at said relatively short length of said continuous plastic zipper to presoften the male and female profile sections of said relatively short length of continuous plastic zipper prior to attaching said zipper to said plies of sheet material.

9. The method in accordance with claim 8 further comprising interlocking said male and female profiles prior to said heat directing step.

10. The method in accordance with claim 7 further comprising the step of interlocking said male and female profiles prior to said attaching steps.

11. The method in accordance with claim 8 wherein said heat directing step is accomplished by directing a hot air blast directly at the surfaces of said male and female profile sections within said relatively short length of said continuous plastic zipper to be presoftened.

12. The method in accordance with claim 11 comprising the further step of providing said two plies of plastic sheet material by folding a single sheet of plastic material into a generally tubular shape.

13. The method in accordance with claim 11 wherein said hot air blast for preheating is directed against said surfaces of said male and female profile sections simultaneously from more than one direction.

* * * * *